(12) United States Patent
Jiang et al.

(10) Patent No.: US 12,537,572 B2
(45) Date of Patent: Jan. 27, 2026

(54) NODE IDENTIFICATION METHOD AND APPARATUS, DEVICE, AND READABLE STORAGE MEDIUM

(71) Applicant: VIVO MOBILE COMMUNICATION CO., LTD., Dongguan (CN)

(72) Inventors: Dajie Jiang, Dongguan (CN); Kun Yang, Dongguan (CN); Pu Yuan, Dongguan (CN); Fei Qin, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 351 days.

(21) Appl. No.: 18/140,608

(22) Filed: Apr. 27, 2023

(65) Prior Publication Data
US 2023/0261708 A1    Aug. 17, 2023

Related U.S. Application Data

(63) Continuation of application No. PCT/CN2021/129118, filed on Nov. 5, 2021.

(30) Foreign Application Priority Data

Nov. 6, 2020   (CN) .......................... 202011233774.0

(51) Int. Cl.
*H04B 7/06* (2006.01)
*H04L 5/00* (2006.01)
*H04W 40/24* (2009.01)

(52) U.S. Cl.
CPC .......... *H04B 7/061* (2013.01); *H04L 5/0091* (2013.01); *H04W 40/246* (2013.01); *H04L 5/0007* (2013.01); *H04L 5/0048* (2013.01)

(58) Field of Classification Search
CPC ... H04B 7/061; H04B 7/04013; H04L 5/0091; H04L 5/0007; H04L 5/0048; H04W 40/246; H04W 48/16; H04W 16/28; H04W 84/047; H04W 16/04; H04W 72/04
See application file for complete search history.

(56) References Cited

U.S. PATENT DOCUMENTS

2004/0097190 A1   5/2004  Durrant et al.
2004/0266338 A1  12/2004  Rowitch
(Continued)

FOREIGN PATENT DOCUMENTS

CN    111416646 A    7/2020
CN    111436062 A    7/2020
(Continued)

OTHER PUBLICATIONS

Extended European Search Report issued in related European Application No. 21888671.1, mailed Feb. 28, 2024, 10 pages.
(Continued)

*Primary Examiner* — Christopher M Brandt
(74) *Attorney, Agent, or Firm* — IPX PLLC

(57) ABSTRACT

A node identification method and apparatus, a device, and a readable storage medium are provided. The method includes: obtaining first information, where the first information is related to a signal sent by a base station; and determining, according to the first information, one or more nodes associated with the base station.

18 Claims, 12 Drawing Sheets

301

Obtain first information, where the first information is associated with a signal transmitted by a base station

302

Determine, according to the first information, one or more nodes associated with the base station

(56) References Cited

U.S. PATENT DOCUMENTS

2011/0177823 A1* 7/2011 Miao ................. H04B 7/155
                                                  455/450
2014/0341106 A1* 11/2014 Bandoh ............. H04W 16/26
                                                  370/315

FOREIGN PATENT DOCUMENTS

| CN | 113382439 A   | 9/2021 |
|----|---------------|--------|
| WO | 2020027713 A1 | 2/2020 |

OTHER PUBLICATIONS

International Search Report issued in corresponding International Application No. PCT/CN2021/129118, mailed Dec. 22, 2021, 4 pages.

* cited by examiner

401

Change or control a characteristic of a first signal sent by a base station associated with a node, where characteristic change information of the first signal is associated with information about the node

Send a second signal to a first node associated with the base station, where related information of the second signal corresponds to the first node

FIG. 5

NODE IDENTIFICATION METHOD AND APPARATUS, DEVICE, AND READABLE STORAGE MEDIUM

CROSS-REFERENCE TO RELATED APPLICATIONS

This application is a continuation of International Application No. PCT/CN2021/129118, filed Nov. 5, 2021, which claims priority to Chinese Patent Application No. 202011233774.0, filed Nov. 6, 2020. The entire contents of each of the above-referenced applications are expressly incorporated herein by reference.

TECHNICAL FIELD

This application pertains to the field of communication technologies, and relates to a node identification method and apparatus, a device, and a readable storage medium.

BACKGROUND

An intelligent surface device is composed of a large-scale component array and an array control module. The large-scale component array is a large quantity of component units that are regularly and repeatedly arranged on a planar bottom plate. To achieve a considerable signal control effect, hundreds or thousands of component units are usually required to form a component array. Each component unit has a variable component structure. For example, the component unit includes a Positive Intrinsic-Negative (PIN) diode, and an on/off state of the PIN diode determines a response mode of the component unit to an external wireless signal. An array control module of an intelligent surface may control an operating state of each component unit, to dynamically or semi-statically control a response mode of each component unit to a wireless signal. Radio response signals of component units in a large-scale component array are superposed to form a specific beam propagation characteristic in a macro sense. The control module is a "brain" of the intelligent surface device, and determines a wireless signal response beam of the intelligent surface according to a requirement of a communication system, so that an original static communication environment becomes "intelligent" and "controllable".

Currently, how a terminal identifies a node associated with a base station is an urgent problem to be resolved.

SUMMARY

Embodiments of this application provide a node identification method and apparatus, a device, and a readable storage medium, so that a terminal identifies a node associated with a base station.

According to a first aspect, a node identification method is provided and is performed by a terminal, including:
  obtaining first information, where the first information is related to a signal sent by a base station; and
  determining, according to the first information, one or more nodes associated with the base station; where
  the node includes at least one of the following:
  a reconfigurable intelligent surface node;
  a relay node; or
  an IAB node.

According to a second aspect, a node identification method is provided and is performed by a node, including: changing or controlling a characteristic of a first signal sent by a base station associated with the node; where characteristic change information of the first signal is associated with information about the node.

According to a third aspect, a node identification method is provided and is performed by a base station, including:
  sending a second signal to a first node associated with the base station, where related information of the second signal corresponds to the first node.

According to a fourth aspect, a node identification apparatus is provided, including:
  a first obtaining module, configured to obtain first information, where the first information is related to a signal sent by a base station; and
  a first determining module, configured to determine, according to the first information, one or more nodes associated with the base station; where
  the node includes at least one of the following:
  a reconfigurable intelligent surface node;
  a relay node; or
  an IAB node.

According to a fifth aspect, a node identification apparatus is provided, including:
  a processing module, configured to change or control a characteristic of a first signal sent by a base station associated with a node; where
  characteristic change information of the first signal is associated with information about the node.

According to a sixth aspect, a node identification apparatus is provided, including:
  a fourth sending module, configured to send a second signal to a first node associated with a base station, where related information of the second signal corresponds to the first node.

According to a seventh aspect, a terminal is provided and includes a processor, a memory, and a program that is stored in the memory and that can run on the processor, and when the program is executed by the processor, steps in the method described in the first aspect are implemented.

According to an eighth aspect, a network side device is provided and includes a processor, a memory, and a program that is stored in the memory and that can run on the processor, and when the program is executed by the processor, steps in the method described in the second aspect or the third aspect are implemented.

According to a ninth aspect, a readable storage medium is provided. The readable storage medium stores a program or an instruction, and when the program or the instruction is executed by a processor, steps in the method described in the first aspect, the second aspect, or the third aspect are implemented.

According to a tenth aspect, a computer program product is provided. The computer program product is stored in a non-volatile storage medium, and the computer program product is executed by at least one processor to implement steps in the method described in the first aspect, the second aspect, or the third aspect.

According to an eleventh aspect, a chip is provided. The chip includes a processor and a communication interface, the communication interface is coupled to the processor, and the processor is configured to run a program or an instruction to implement the method described in the first aspect, the second aspect, or the third aspect.

In the embodiments of this application, the terminal may identify one or more nodes associated with the base station, to help the base station more accurately adjust a beam of each node, thereby improving signal strength of the terminal or improving positioning accuracy based on multiple nodes.

BRIEF DESCRIPTION OF DRAWINGS

FIG. 4 is a second schematic diagram of a node identification method according to an embodiment of this application;

FIG. 5 is a first schematic diagram of a node identification method according to an embodiment of this application;

DETAILED DESCRIPTION

Figure 1:
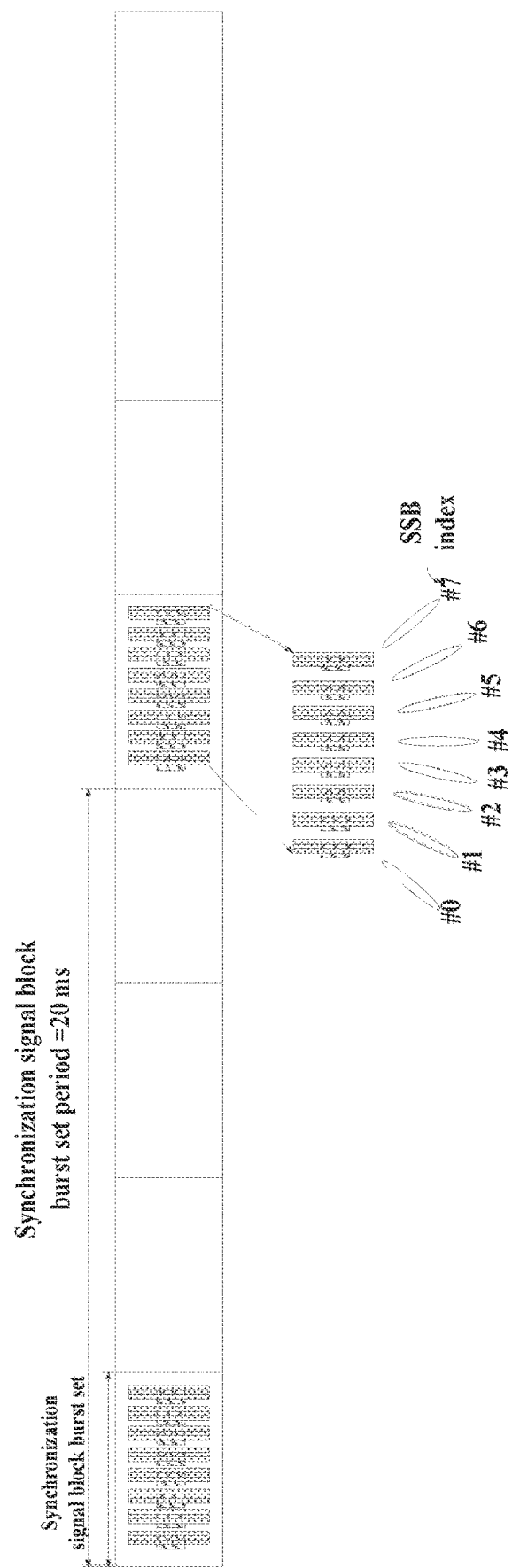
FIG. 1 is a schematic diagram of an SSB in NR.

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts shall fall within the protection scope of this application.

Terms "first" and "second" in the specification and claims of this application are used to distinguish between similar objects, and do not need to be used to describe a specified order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and" represents at least one of connected objects, and the character "/" generally represents an "or" relationship between associated objects.

It should be noted that the technology described in this application is not limited to a Long Term Evolution (LTE)/LTE-advanced (LTE-A) system, and may also be used in various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application are often used interchangeably. The described technology may be used in the foregoing system and radio technology, and may also be used in another system and radio technology. However, a New Radio (NR) system is described below as an example, and the term NR is used in most of the descriptions, although these technologies can also be used in an application other than an application of the NR system, for example, a $6^{th}$ Generation (6G) communication system.

To facilitate understanding of the embodiments of this application, the following describes the following technical points:

1. Intelligent Surface/Super-Material Surface

An intelligent surface is an emerging technology, and there are the following several related terms that represent similar technologies or entities. These terms include:

Large Intelligent Surface (LIS);

Smart Reflect Array (SRA);

Reconfigurable Reflect Array (RRA);

Intelligent Reflecting Surface (IRS); and

Reconfigurable Intelligent Surface (RIS).

Intelligent surface technology is applied in multiple technical fields. There are many different design solutions according to different application scenarios. There are a tunable resonator variable capacitance type, a guided wave waveguide type, an element rotation polarization type according to physical principle classifications of component units. There are a reflective intelligent surface and a transmissive intelligent surface according to a wireless signal output form. There are a phase control intelligent surface, an amplitude control intelligent surface, and an amplitude-phase joint control intelligent surface according to wireless signal response parameter classifications. There are a continuous control type and a discrete control type according to response parameter control classifications. There are a static control intelligent surface and a semi-static/dynamic control intelligent surface according to a frequency or a speed of controlling an amplitude and a phase of the intelligent surface. The static intelligent surface may be currently applied to an existing system, for example, a fourth generation mobile communication technology (fourth generation, 4G)/a fifth generation mobile communication technology (fifth generation, 5G) system. In view of complexity of the design and fabrication of a component, discrete controlled component units using a single radio signal response parameter are generally chosen for research in the academic community. Currently, an intelligent Reflecting Surface (IRS) widely discussed in the academic community is a phase control intelligent surface based on signal reflection, and a phase of a reflected signal of a component unit is controlled by using indication information of one bit, to implement phase inversion of 0 or n.

Because radio frequency and baseband processing circuits are not required, the intelligent surface device has several advantages over a conventional wireless communication transceiver device:

(1) The intelligent surface device has lower costs and lower implementation complexity.

(2) The intelligent surface device has lower power consumption.

(3) An intelligent surface introduces no additional thermal noise at a receive end.

(4) The intelligent surface device is thin in thickness and light in weight, and can be deployed flexibly.

There are the following types of RIS reflecting units:

(1) Tunable resonator: A variable capacitor is integrated into a resonator to generate a phase shift by changing a frequency of a frequency-agile patch resonator.

(2) Guide wave control method: In this case, an arrival space wave is coupled to a guide wave by using an antenna, and then the guide wave phase shifts and then is re-transmitted to form an antenna phase shifter.

(3) Rotating technology of a circular polarization wave: designed by using a reflection rule of an electromagnetic wave.

Reflecting array/intelligent surfaces are divided into two types according to whether dynamical control can be performed:

(1) Static reflecting array/intelligent surface: A structure and a function of the reflecting array may be fixed. For an incident wave at one angle, a super-surface unit causes a fixed change in characteristics such as an amplitude, a phase, and a polarization manner of the incident wave, to obtain a corresponding reflection wave.

(2) Dynamic reflecting array/intelligent surface: A structure and a function of the reflecting array may be controlled. For an incident wave at one angle, characteristics such as an amplitude, a phase, and a polarization manner of the incident wave may change differently by using programmable control, to obtain a corresponding reflection wave. A switch element (such as a diode) needs to be introduced into a reflection unit to implement programmable control on a reflecting super surface. A PIN diode is currently a common option for controlling a reconfigurable super surface. The PIN diode has a relatively wide range of radio frequency impedance and low distortion, and is widely used in the microwave radio frequency field. The switch element in the reflection unit has multiple different states, and switching of different states can be implemented by controlling on/off of the switch element. When the switch element is in two cases: on and off, a structure and performance of a corresponding reflection unit change greatly. In other words, reflection units in different states have different control modes for characteristics such as an amplitude, a phase, and polarization of an incident wave.

2. An Intelligent Surface Directly Modulates a Signal.

The intelligent surface may directly regulate wave front and various electromagnetic parameters such as a phase, an amplitude, a frequency, and even polarization of an electromagnetic signal without complex baseband processing and radio frequency receiving and receiving operation. Therefore, the intelligent surface may be used to directly modulate a signal in addition to changing a radio channel environment to enhance reception quality of a third-party signal.

For example, adjustment of a reflection phase/amplitude of an intelligent surface electromagnetic unit is not only used to maximize a received signal-to-noise ratio of an incoming radio magnetic wave, but can also be used for information transmission of the LIS. A receive end receives information about the intelligent surface by detecting a phase/amplitude change of the intelligent surface reflection signal.

3. Passive Intelligent Surface

Because the intelligent surface is composed of a large quantity of component units and has no radio frequency and baseband processing capability, the intelligent surface is referred to as a passive intelligent surface.

4. Active-Passive Combined Intelligent Surface (or Active Intelligent Surface)

Because the intelligent surface is composed of a large quantity of component units and has no radio frequency and baseband processing capability, the base station cannot separately obtain channel information from the base station to the intelligent surface and channel information from the intelligent surface to a terminal. A receive signal of the base station or the terminal is formed by superimposing response signals of a large quantity of intelligent surface component units. Changing an operating state of one or a small quantity of component units does not significantly change the receive signal. A possible measurement scheme is to mount a small quantity of active component units on the intelligent surface, so that the intelligent surface can perform channel measurement and feedback. The base station calculates a reasonable intelligent surface configuration parameter from limited channel information by using a compression sensing algorithm or a deep learning algorithm. An intelligent surface-based communication system needs an efficient channel measurement mechanism, to improve end-to-end signal quality as much as possible while ensuring low complexity of the intelligent surface. Such an intelligent surface on which some active components are mounted has a capability of receiving a signal and even transmitting a signal, and is an active-passive combined intelligent surface (or an active intelligent surface).

5. Synchronization Signal Block (Synchronization Signal and PBCH Block, SSB) in New Radio (NR):

As shown in FIG. 1, one SSB in the NR includes a Primary Synchronization Signal (PSS), a Secondary Synchronization Signal (SSS), and a Physical broadcast channel (PBCH) that are distributed on four consecutive Orthogonal frequency division multiplex (OFDM) symbols. One SSB burst set period includes multiple SSBs (for example, includes eight SSBs), and different SSBs may correspond to different beam directions. An SSB burst set period supported by the NR is 5 milliseconds (ms), 10 ms, 20 ms, or the like.

Figure 2:
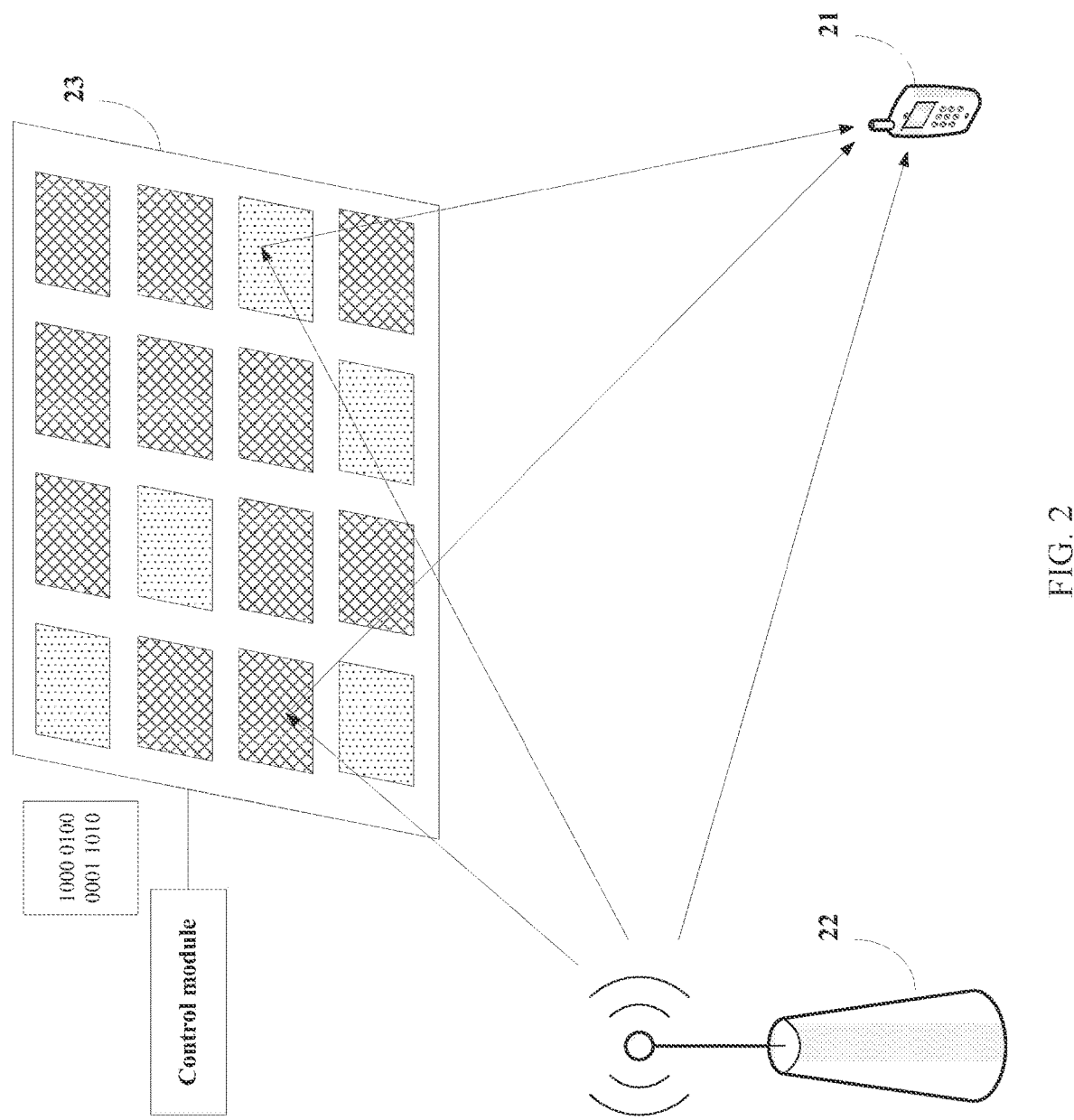
FIG. 2 is a block diagram of a wireless communication system to which an embodiment of this application is applicable.

FIG. 2 is a block diagram of a wireless communication system to which an embodiment of this application is applicable. The wireless communication system includes a terminal 21, a network side device 22, and an intelligent surface device 23. The terminal 21 may also be referred to as a terminal device or User Equipment (UE). The terminal 21 may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or a vehicle-mounted device (VUE), or a pedestrian terminal (PUE). The wearable device includes a band, a headset, eyeglasses, or the like. It should be noted that a specific type of the terminal 21 is not limited in this embodiment of this application.

The network side device 22 may be a base station or a core network. The base station may be referred to as a NodeB, an evolved Node B, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a Wireless Local Area Network (WLAN) access point, a Wireless Fidelity (WiFi) node, a Transmitting Receiving Point (TRP), or another suitable term in the field provided that a same technical effect is achieved. The base station is not limited to a specific technical term. It should be noted that, in this embodiment of this application, only a base station in an NR system is used as an example, but a specific type of the base station is not limited.

A node identification method and apparatus, a device, and a readable storage medium provided in the embodiments of this application are described in detail below with reference to the accompanying drawings by using specific embodiments and application scenarios thereof.

Figure 3:
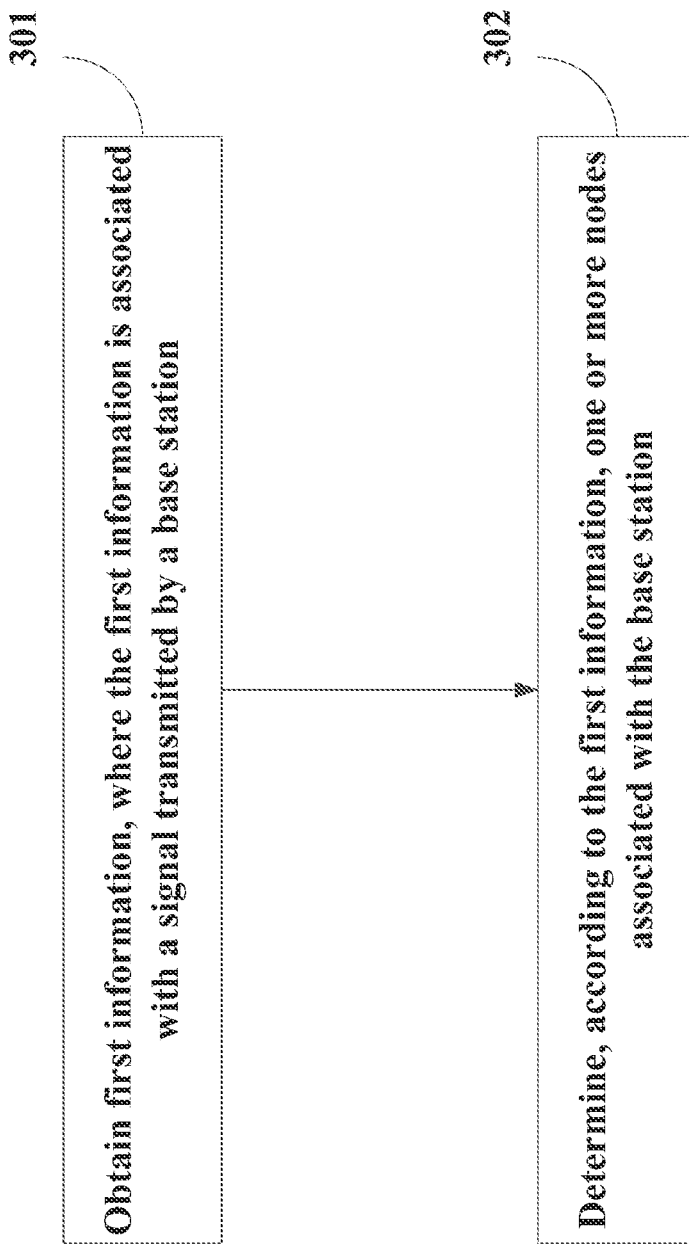
FIG. 3 is a first schematic diagram of a node identification method according to an embodiment of this application.

As shown in FIG. 3, this application provides a node identification method that is performed by a terminal and includes step 301 and step 302.

Step 301: Obtain first information, where the first information is related to a signal sent by a base station.

Step 302: Determine, according to the first information, one or more nodes associated with the base station.

The node includes at least one of the following:
a Reconfigurable Intelligent Surface (RIS) node;
a relay node; or
an Integrated Access and Backhaul (IAB) node.

For example, one or more nodes associated with a serving cell are identified or determined according to the first information, or one or more nodes associated with a neighboring cell are determined according to the first information.

It may be understood that the base station may learn whether there is the node, or a deployment location of the node, or a parameter of the node (for example, a pattern set, bit quantization precision, or an operation signal feature).

Figure 6:
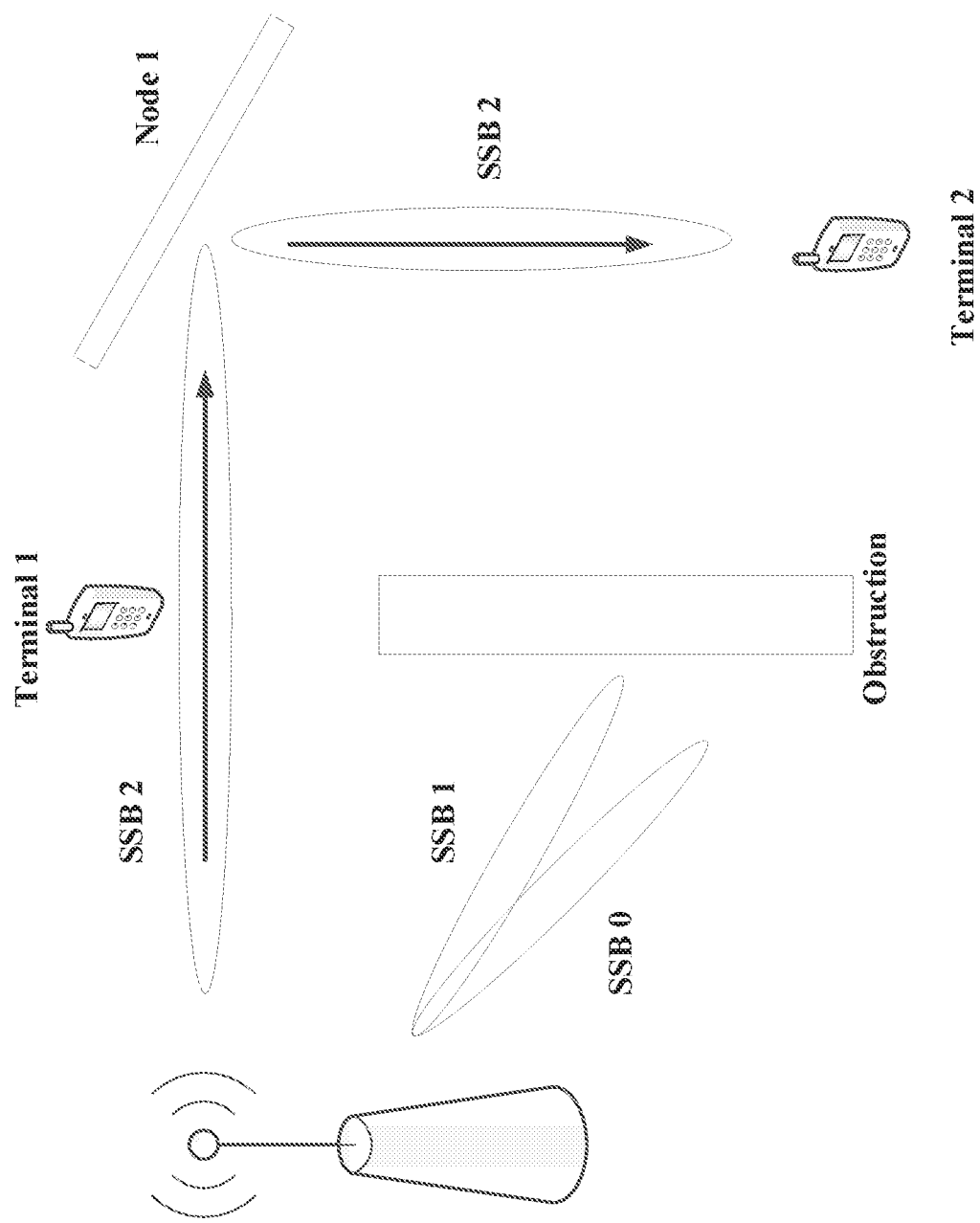
FIG. 6 is a schematic diagram of a scenario in which a node is used for a relay according to an embodiment of this application.

In this embodiment of this application, application scenarios in which the terminal identifies different nodes may include:

Scenario 1: A scenario in which a node is used for a relay:
In other words, the base station cannot cover a terminal, and the terminal can access a base station cell only by using a node. As shown in FIG. 6, a terminal 1 is located between the base station and the node, and the terminal 1 receives an SSB 2; a terminal 2 is located in a node coverage area, but cannot receive a signal from the base station. In this way, the terminal 1 can only receive a signal sent by the base station, and the terminal 2 can only receive a signal of the base station that is changed by a node 1. In this way, the terminal 2 identifies the node 1 and reports the node 1 to the base station. The base station can more accurately adjust beams of the terminal 1 and the terminal 2, for example, enhance a signal of the terminal 2 through joint optimization between the base station and an LIS, and enhance a signal of the terminal 1 through beam adjustment of the base station.

Scenario 2: A scenario in which coverage of UE is enhanced:
When a data service rate of the UE exceeds a current channel capacity, a system provides stronger signal quality or increases data stream multiplexing by using a node, to improve a data communication rate of the UE.

In some embodiments, the cell may configure multiple associated nodes for the UE, and the UE can identify the multiple nodes. Further, the UE may feed back an expected beam of each node to the base station.

Scenario 3: A scenario in which positioning is performed based on multiple nodes:
The UE can identify signals of the multiple nodes, and can improve node-based positioning precision.

It may be understood that, in this embodiment of this application, the application scenarios in which the terminal identifies different nodes are not limited to the foregoing three scenarios.

In some embodiments, step 301 includes: detecting a first signal sent by the base station; and determining the first information according to the first signal, where the first information includes characteristic change information of the first signal, the characteristic change information of the first signal corresponds to information about a node (for example, an index of the node), and a characteristic change in the first signal is changed or controlled by the node. Step 302 includes: determining, according to the characteristic change information of the first signal, information about the one or more nodes associated with the base station.

In this embodiment of this application, before the detecting a first signal sent by the base station, the method further includes: determining whether the terminal can detect a signal sent by the node; and if the terminal can detect the signal sent by the node, performing the step of detecting a first signal sent by the base station.

In this embodiment of this application, the method further includes: sending a detection result of the first signal, where the detection result includes: whether a signal sent by the node can be detected (that is, whether pairing of the node succeeds), and/or whether information about the node (for example, the index of the node) associated with the base station can be determined.

In this embodiment of this application, the determining, according to the characteristic change information of the first signal, information about the node associated with the base station includes:
determining, according to the characteristic change information of the first signal and a first association relationship, an index of the node associated with the base station; where the first association relationship includes an association relationship between a characteristic change rule of the first signal and the index of the node.

In some embodiments, the first association relationship is agreed upon in a protocol or sent by the base station to the terminal.

In this embodiment of this application, the method further includes: if the node associated with the base station is activated or disabled, obtaining information about the activated or disabled node by receiving signaling sent by the base station; or if the association relationship between the characteristic change rule of the first signal and the index of the node changes, obtaining, by receiving signaling sent by the base station, an updated association relationship between the characteristic change rule of the first signal and the index of the node.

In some embodiments, the characteristic of the first signal may include one or more of the following: (1) a phase, (2) an amplitude, (3) a polarization manner, (4) a frequency, and (5) an Orbital Angular Momentum (OAM) manner.

In this embodiment of this application, that the characteristic change of the first signal is changed or controlled by the node includes:
a change in a phase, an amplitude, a polarization manner, a frequency, and/or an OAM manner of the first signal is changed or controlled by adjusting on or off of a diode associated with the node; or
a change in a phase, an amplitude, a polarization manner, a frequency, and/or an OAM manner of the first signal is changed or controlled by applying different voltages to the node.

In this embodiment of this application, a characteristic of the first signal changes in time domain and/or frequency domain.

In this embodiment of this application, one or more of the following: a manner in which the characteristic of the first signal changes with a time domain resource, a changing time domain resource granularity, a changing period, changing time unit information, and a start location of the changing period is agreed upon in a protocol or sent by the base station to the terminal.

In this embodiment of this application, the time domain resource granularity is every M Orthogonal frequency division multiplex (OFDM) symbols, where M is greater than or equal to 1; or is every N slots, where N is greater than or equal to 1; or is every K synchronization signal block (Synchronization Signal and PBCH block, SSB) periods, where K is greater than or equal to 1.

In this embodiment of this application, one or more of the following: a manner in which the characteristic of the first signal changes with a frequency domain resource and a changing frequency domain resource granularity are agreed upon in a protocol or sent by the base station to the terminal.

In this embodiment of this application, the frequency domain resource granularity is a subcarrier, a subcarrier group, a Bandwidth Part (BWP), a BWP group, a Radio Beare (RB), an RB bundle, or an RB group.

In this embodiment of this application, the first signal includes at least one of the following: (1) an SSB, (2) a Channel State Information Reference Signal (CSI-RS), (3) a System Information Block (SIB) 1, (4) a Demodulation Reference Signal (DMRS), or (5) a tracking reference signal (TRS).

In this embodiment of this application, in step 301, a second signal sent by the base station to a first node is received, where related information of the second signal corresponds to the first node; and the first information is determined according to the second signal, where the first information includes the related information of the second signal. In step 302, the one or more nodes associated with the base station are determined according to the related information of the second signal.

In this embodiment of this application, the related information of the second signal includes at least one of the following: a sequence format, a sequence phase, an initial sequence, a scrambling sequence, or an orthogonal cover code of a sequence.

In this embodiment of this application, the determining, according to the related information of the second signal, one or more nodes associated with the base station includes:
determining, according to the related information of the second signal and a second association relationship, an index of the node associated with the base station, where the second association relationship includes an association relationship between the related information of the second signal and the index of the node.

In some embodiments, the second association relationship is agreed upon in a protocol or sent by the base station to the terminal.

In this embodiment of this application, the second signal includes one or more of the following: (1) an SSB, (2) a CSI-RS, (3) a DMRS, (4) a message 2 (MSG 2), (5) a message 4 (MSG 4), and (6) a message B (MSG B). In some embodiments, the CSI-RS or the DMRS is quasi-co-located with the SSB.

In this embodiment of this application, in step 301, the first information sent by the base station is received, where the first information indicates a third association relationship, and the third association relationship includes an association relationship between a third signal and an index of the node.

In some embodiments, the third signal includes one or more of the following: (1) an SSB, (2) a CSI-RS, and (3) a DMRS.

In this embodiment of this application, the method further includes: sending information about one or more nodes identified by the terminal (for example, identification information of the node) to a network side. In some embodiments, the information about the one or more nodes is used by the network side to adjust a beam of a node associated with the terminal.

In this embodiment of this application, if the terminal identifies multiple nodes, the method further includes: obtaining signals of the multiple nodes; and positioning the terminal according to the signals of the multiple nodes.

In this embodiment of this application, the terminal may identify one or more nodes associated with the base station, to help the base station more accurately adjust a beam of each node, thereby improving signal strength of the terminal or improving positioning accuracy based on multiple nodes.

As shown in FIG. 4, an embodiment of this application provides a node identification method that is performed by an RIS. Specific steps include step 401.

Step 401: Change or control a characteristic of a first signal sent by a base station associated with a node, where characteristic change information of the first signal is associated with information about the node.

In this embodiment of this application, the characteristic of the first signal includes one or more of the following: (1) a phase, (2) an amplitude, (3) a polarization manner, (4) a frequency, and (5) an OAM manner.

In this embodiment of this application, the changing or controlling a characteristic of the first signal includes:

Manner 1: A phase, an amplitude, a polarization manner, a frequency, and/or an OAM manner of the first signal sent by the base station associated with the node are/is changed or controlled by adjusting on or off of a diode associated with the node.

Manner 2: A phase, an amplitude, a polarization manner, a frequency, and/or an OAM manner of the first signal sent by the base station associated with the node are/is changed or controlled by applying different voltages to the node.

In this embodiment of this application, the characteristic of the first signal changes in time domain and/or frequency domain.

In this embodiment of this application, one or more of the following: a manner in which the characteristic of the first signal changes with a time domain resource, a changing time domain resource granularity, a changing period, changing time unit information, and a start location of the changing period is agreed upon in a protocol or sent by the base station to the terminal.

In this embodiment of this application, the time domain resource granularity is every M OFDM symbols, where M is greater than or equal to 1; or is every N slots, where N is greater than or equal to 1; or is every K SSB periods, where K is greater than or equal to 1.

In this embodiment of this application, one or more of the following: a manner in which the characteristic of the first signal changes with a frequency domain resource and a changing frequency domain resource granularity are agreed upon in a protocol or sent by the base station to the terminal.

In this embodiment of this application, the frequency domain resource granularity is a subcarrier, a subcarrier group, a BWP, a BWP group, an RB, an RB bundle, or an RB group.

In this embodiment of this application, the first signal includes at least one of the following: (1) an SSB, (2) a CSI-RS, (3) a SIB 1, (4) a DMRS, or (5) a TRS.

In this embodiment of this application, before the changing or controlling a characteristic of the first signal sent by the base station associated with the node, the method further includes:

receiving configuration information sent by the base station associated with the node; where the configuration information includes one or more of the following:

(1) a first association relationship;
(2) a second association relationship;
(3) a third association relationship;
(4) at least one of a time domain resource granularity at which the characteristic of the first signal changes with a time domain resource, a changing period, changing time unit information, or a start location of a changing period; and
(5) at least one of a manner in which the characteristic of the first signal changes with a frequency domain resource and a changing frequency domain resource granularity; where the first association relationship includes an association relationship between a characteristic change rule of the first signal and an index of the node;

the second association relationship includes an association relationship between related information of a second signal and the index of the node, and the second signal includes one or more of the following: an SSB, a CSI-RS, a DMRS, an MSG 2, an MSG 4, and an MSG B; and the third association relationship includes an association relationship between a third signal and the index of the node, and the third signal includes one or more of the following: an SSB, a CSI-RS, and a DMRS.

In this embodiment of this application, by changing or controlling a characteristic change of a signal of the base station, a node implicitly indicates information about the node, such as an index of the node, so that a terminal identifies, according to characteristic change information of the signal, one or more nodes associated with the base station, and helps the base station more accurately adjust a beam of each node, thereby improving signal strength of the terminal or improving positioning accuracy based on multiple nodes.

As shown in FIG. 5, an embodiment of this application provides a node identification method that is performed by a base station. Specific steps include step 501.

Step 501: Send a second signal to a first node associated with the base station, where related information of the second signal corresponds to the first node.

In this embodiment of this application, the related information of the second signal includes at least one of the following:

(1) a sequence format, (2) a sequence phase, (3) an initial sequence, (4) a scrambling sequence, or (5) an orthogonal cover code of a sequence.

In this embodiment of this application, the second signal includes one or more of the following: (1) an SSB, (2) a CSI-RS, (3) a DMRS, (4) an MSG 2, (5) an MSG 4, or (6) an MSG B.

In this embodiment of this application, the method further includes:

sending configuration information to the first node; where the configuration information includes one or more of the following.

(1) a first association relationship;
(2) a second association relationship;
(3) a third association relationship;
(4) at least one of a time domain resource granularity at which the characteristic of the first signal changes with a time domain resource, a changing period, changing time unit information, and a start location of a changing period; and
(5) at least one of a manner in which the characteristic of the first signal changes with a frequency domain resource and a changing frequency domain resource granularity; where the first association relationship includes an association relationship between a characteristic change rule of the first signal and an index of the node;

the second association relationship includes an association relationship between the related information of the second signal and the index of the node; and the third association relationship includes an association relationship between a third signal and the index of the node, and the third signal includes one or more of the following: an SSB, a CSI-RS, and a DMRS.

In this embodiment of this application, the terminal may identify, based on the received second signal, one or more nodes associated with the base station, to help the base station more accurately adjust a beam of each node, thereby improving signal strength of the terminal or improving positioning accuracy based on multiple nodes.

The embodiments of this application are described below with reference to Embodiment 1, Embodiment 2, and Embodiment 3, where a node is an RIS.

Embodiment 1: The RIS Changes/Controls a Characteristic of a First Signal to Implicitly Indicate Information about the RIS Step 1: A base station sends a configuration message, where the configuration message includes one or more of the following:

(1) a configuration parameter of the first signal, a signal identifier-related parameter, a time-frequency resource, a period, an aperiodic parameter, and the like;
(2) a signal manipulation/signal modulation parameter of the RIS, a quantity of RIS states, a coding and modulation scheme (differential or direct modulation), an RIS type (a manipulation signal characteristic, an amplitude/phase/polarization direction, or the like), and an RIS switching occasion (switching in a cyclic prefix (CP) or a symbol).

In some embodiments, the base station sends (by using an interface between the base station and the RIS) corresponding configuration information to indicate the configuration parameter of the first signal and the like.

The RIS determines a forwarding pattern corresponding to each symbol or each sending occasion of the first signal according to the configuration information and coding and modulation information of an index or identifier (index/ID) of the RIS.

A quantity of symbols configured for the first signal or a quantity of sending occasions is not less than an amount of coding and modulation information that needs to be transmitted by the RIS.

Step 2: UE detects a first signal sent by the base station.

The first signal includes multiple symbols or multiple sending occasions.

The base station sends the first signal by using a same transmit beam, and the RIS works according to the forwarding pattern determined in the previous step.

Step 3: The UE determines information about the RIS, for example, an index of the RIS, according to a characteristic change rule of the first signal and a first association relationship (a coding and modulation scheme of the RIS).

The UE first determines whether the UE can discover an RIS signal (whether the UE can pair with the RIS).

If the RIS signal can be detected, the index (or a characteristic index) of the RIS corresponding to the characteristic of the first signal is determined.

As shown in Table 1, a characteristic change rule X corresponds to an index 1 of the RIS, a characteristic change rule Y corresponds to an index 2 of the RIS, and a characteristic change rule Z corresponds to an index 3 of the RIS.

TABLE 1

| Characteristic change rule of the first signal | Index of the RIS |
|---|---|
| Characteristic change rule X | 1 |
| Characteristic change rule Y | 2 |
| Characteristic change rule Z | 3 |

An association relationship between the characteristic change rule of the first signal and the index of the RIS is defined in a protocol or is notified by the base station to the terminal.

In some embodiments, the first signal includes at least one of the following: an SSB, a CSI-RS, a SIB 1, a DMRS, a TRS, or the like, or another signal.

In some embodiments, the characteristic of the first signal includes at least one time-varying characteristic such as a phase, an amplitude, a polarization manner, a frequency, or an OAM manner.

In this embodiment of this application, a specific method for changing/controlling the characteristic of the first signal by the RIS is as follows:

(1) The RIS changes/controls at least one of a phase, an amplitude, a polarization manner, a frequency, or an OAM manner of the first signal.

(2) The RIS changes/controls at least one of a phase, an amplitude, a polarization manner, a frequency, or an OAM manner of the first signal by adjusting on or off of a diode associated with an RIS unit or applying different voltages to an RIS unit.

If the RIS is added or reduced (activated or disabled) in a cell, information about the activated or disabled node is obtained by receiving signaling sent by the base station, or if an existing association relationship between the RIS and the characteristic of the first signal is changed, the UE is notified in a manner of changing a cell system message, that is, the base station notifies the UE of a system message change by using a paging message, and the UE reads the system message to obtain change information.

In some embodiments, the UE reports a detection result of the first signal, and the detection result indicates whether the UE detects the RIS, whether RIS index detection succeeds, and the like.

Manner 1-1: The characteristic of the first signal changes only in time domain.

One or more of the following: a manner in which the characteristic of the first signal changes with time, a changing time granularity, a changing period, and a start location of the changing period may be defined in a protocol or notified by the base station to the terminal.

A time granularity at which the RIS changes/controls the characteristic of the first signal may be every M (M≥1) OFDM symbols, every N (N≥1) slots, and every K (K≥1) SSB periods. The SSB period may be 5 milliseconds (ms), 10 ms, 20 ms, 40 ms, or the like, that is, a signal characteristic of the base station may be changed at every time granularity.

For example, the first signal is an SSB, and the RIS implicitly indicates information about the RIS by changing a signal characteristic of the SSB.

(1) A changing time granularity: changing once in a maximum of one SSB burst set (burst set) period.

(2) Changing period: four SSB burst set periods.

Figure 7A:
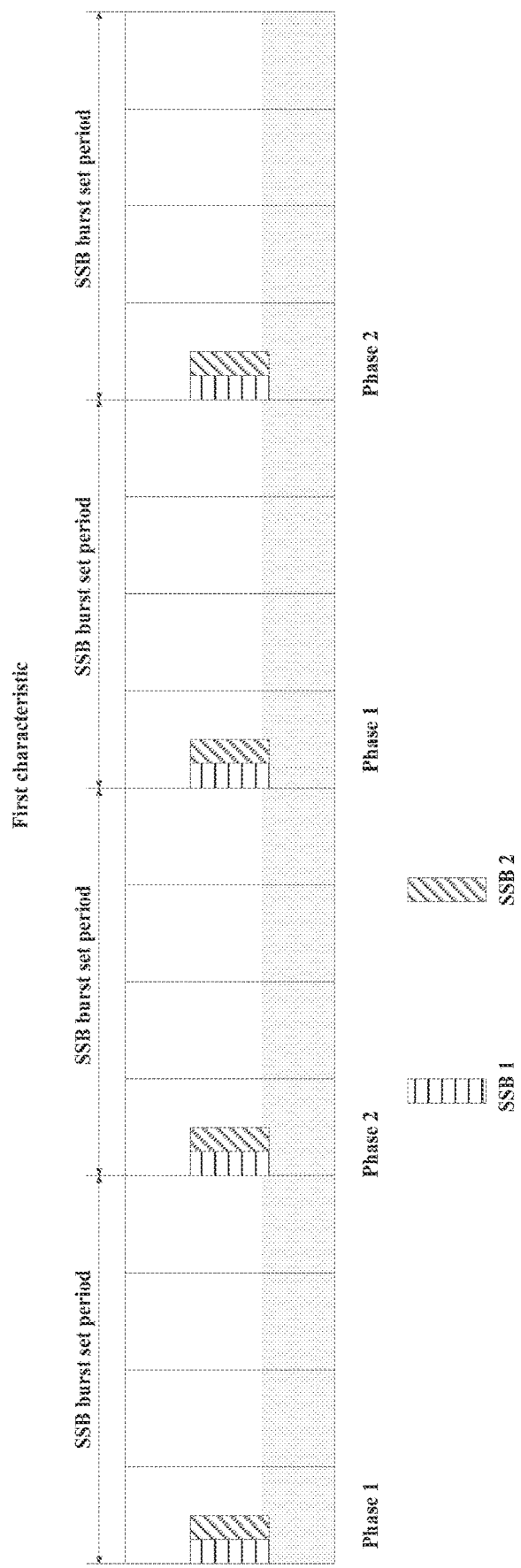
FIG. 7a and FIG. 7b are schematic diagrams in which UE determines, by detecting a phase change feature carried in an SSB, a feature carried in an SSB 1/SSB 2 according to an embodiment of this application.

(3) A manner in which the characteristic of the first signal changes with time:

A first characteristic is: Phases of each SSB burst set in the four SSB burst set periods are respectively a phase 1, a phase 2, a phase 1, and a phase 2, as shown in FIG. 7a.

Figure 7B:
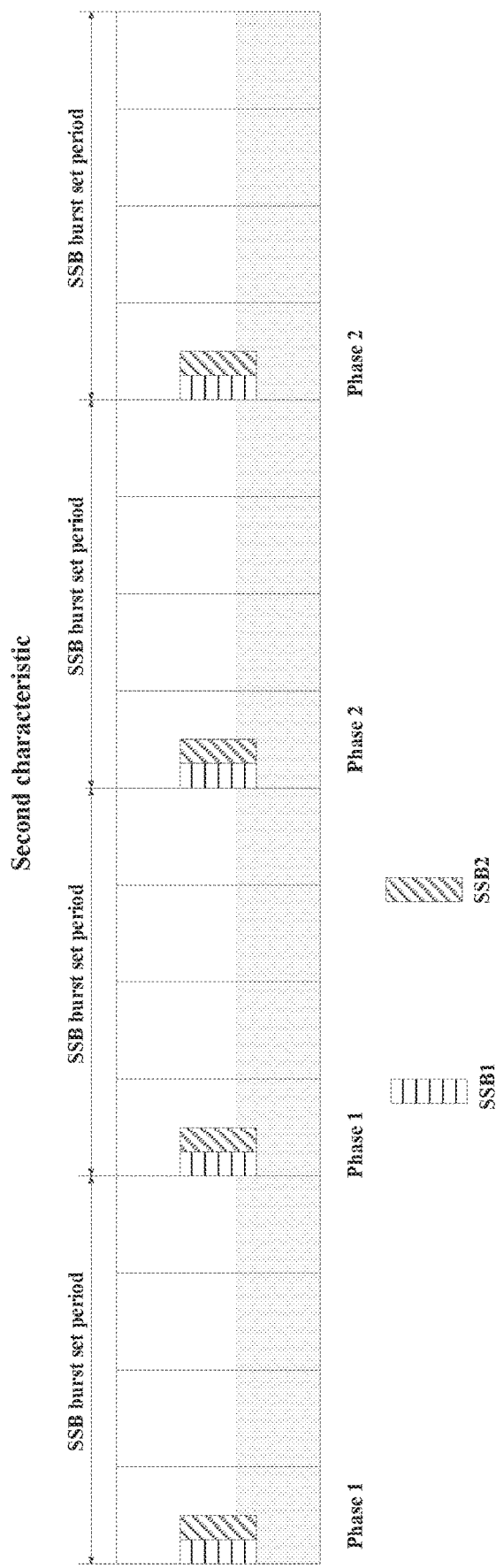

A second characteristic is: Phases of each SSB burst set in the four SSB burst set periods are respectively a phase 1, a phase 1, a phase 2, and a phase 2, as shown in FIG. 7b.

The first characteristic and the second characteristic may be respectively associated with an RIS index 1 and an RIS index 2 (or a characteristic index 1 and a characteristic index 2).

In this way, the UE may determine, by detecting a phase change characteristic carried in the SSB, a characteristic carried in the SSB 1/SSB 2, to determine an index of an RIS associated with the SSB 1/SSB 2.

Manner 1-2: The characteristic of the first signal changes only in frequency domain.

A manner in which the characteristic of the first signal changes differently with a frequency domain resource and a changing frequency domain resource granularity are defined in a protocol or broadcast by the base station.

A frequency domain resource granularity at which the RIS changes/controls the characteristic of the first signal may be every M (M≥1) subcarriers, RBs, RB bundles, and RB groups (including several RBs). In other words, each frequency domain resource granularity may change a signal characteristic of the base station.

Manner 1-3: The characteristic of the first signal changes in both frequency domain and time domain.

In this embodiment, the RIS implicitly indicates information related to the RIS, for example, an index of the RIS, to the UE by changing/controlling a characteristic that the first signal sent by the base station changes with time and the frequency domain resource.

Embodiment 2: Signals Sent by the Base Station to Different RISs Carry RIS Information Method 2-1: The base station has five SSBs, where an SSB 2, an SSB 3, and an SSB 4 are sent by the base station for an RIS 1, and an SSB 0 and an SSB 1 are other two SSBs.

Figure 8:
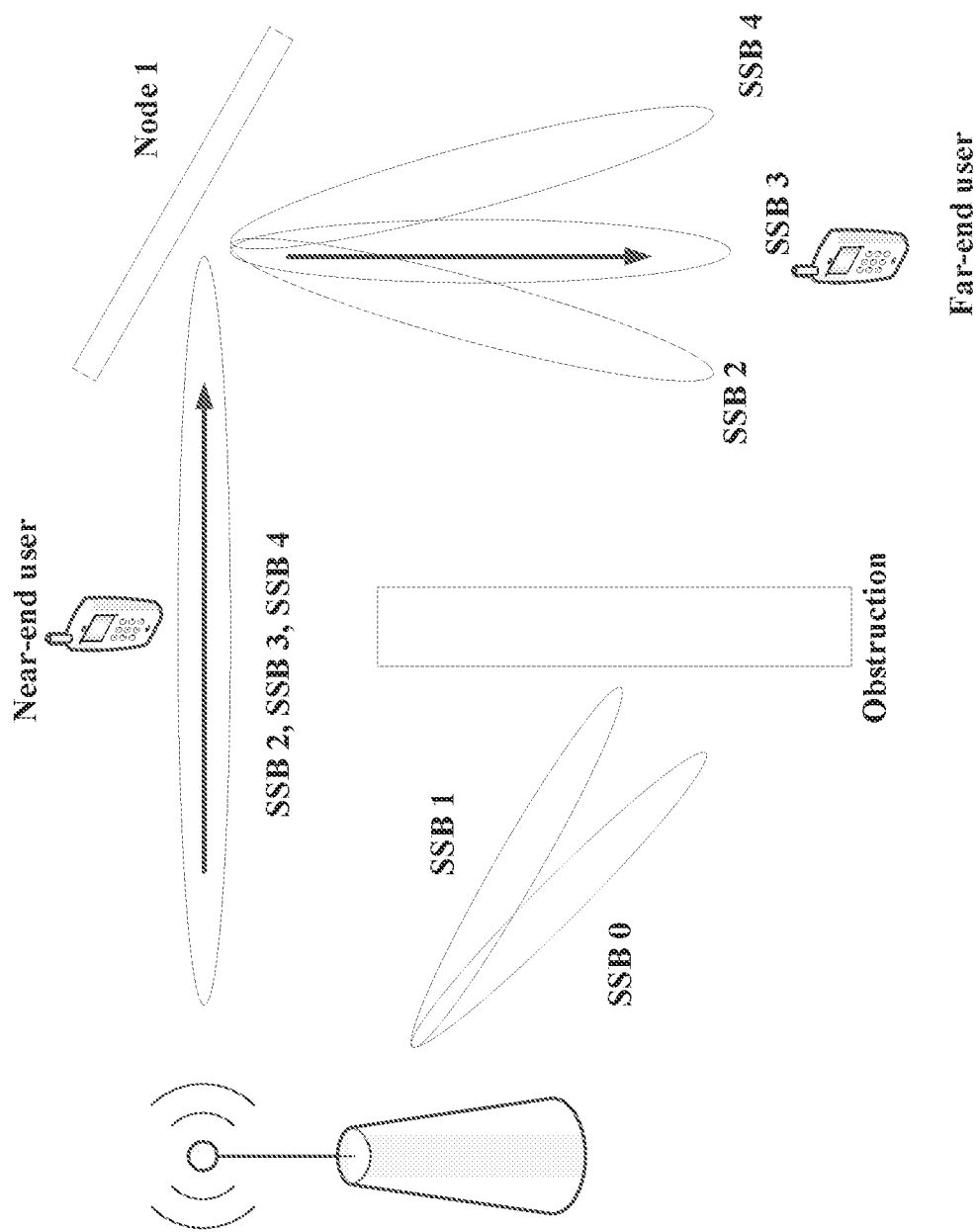
FIG. 8 shows that signals sent by a base station to different nodes carry node information according to an embodiment of this application.

As shown FIG. 8, RIS 1-oriented SSBs (the SSB 2, the SSB 3, and the SSB 4) sent by the base station carry information related to an RIS 1, for example, an initial sequence, a scrambling sequence, or a cover code of a PSS or an SSS of the SSB 2, the SSB 3, and the SSB 4 is related to the RIS 1.

An association relationship between the initial sequence, the scrambling sequence, or the cover code and information about the RIS 1 may be defined in a protocol or indicated by the base station to the UE (for example, by using a SIB/MIB).

In some embodiments, the UE determines, by detecting the SSB, that an RIS associated with the SSB or an RIS within coverage of the SSB may be used.

In some embodiments, the UE further determines, in subsequent RIS-based beam training, whether the UE needs to be assisted by the RIS.

Method 2-2: The SSB does not carry information related to the RIS 1, and a CSI-RS, a DMRS, an MSG 2, an MSG 4, or an MSGB that is sent to the RIS carries the information related to the RIS 1.

An initial sequence, a scrambling sequence, a cover code, or the like of the CSI-RS or the DMRS is related to the RIS 1.

In some embodiments, an association relationship between the initial sequence, the scrambling sequence, or the cover code and the information about the RIS 1 is defined in a protocol or indicated by the base station (for example, by using a SIB, a master information block (MIB), radio resource control (RRC) signaling, a media access control (MAC) control element (CE), or layer-1 signaling) to the UE.

The UE determines, by detecting the CSI-RS or the DMRS, the information about the RIS associated with the UE (an index of the RIS that is carried in a reference signal and a preliminary result of RIS beam training).

In some embodiments, the CSI-RS or the DMRS is quasi-co-located with the SSB.

Method 2-3: Both the SSB and the CSI-RS/DMRS carry the information related to the RIS 1.

If the RIS is added or reduced in a cell, or an existing association relationship between the RIS and the characteristic of the first signal in a cell is changed, the UE is notified in a manner of changing a cell system message, that is, the base station notifies the UE of a system message change through paging, and the UE reads the system message to obtain change information.

Embodiment 3: The Base Station Directly Indicates SSBs that are Associated with the RIS For example, the UE receives an SSB notified by the base station and an index of an RIS associated with the SSB, for example, the SSB 1 is associated with the RIS 1, the SSB 2 is associated with an RIS 2, and the SSB 3 is not associated with any RIS.

The UE receives a CSI-RS/DMRS notified by the base station and an index of an RIS associated with the CSI-RS/DMRS.

If the RIS is added or reduced in a cell, or an existing association relationship between the RIS and the characteristic of the first signal in a cell is changed, the UE is notified in a manner of changing a cell system message, that is, the base station notifies the UE of a system message change by using a paging message, and the UE reads the system message to obtain change information.

It may be understood that the RIS in the foregoing three embodiments may also be a type of relay, such as a layer-1 relay, a layer-2 relay, a layer-3 relay, or an Integrated Access and Backhaul (IAB) node.

Figure 9:
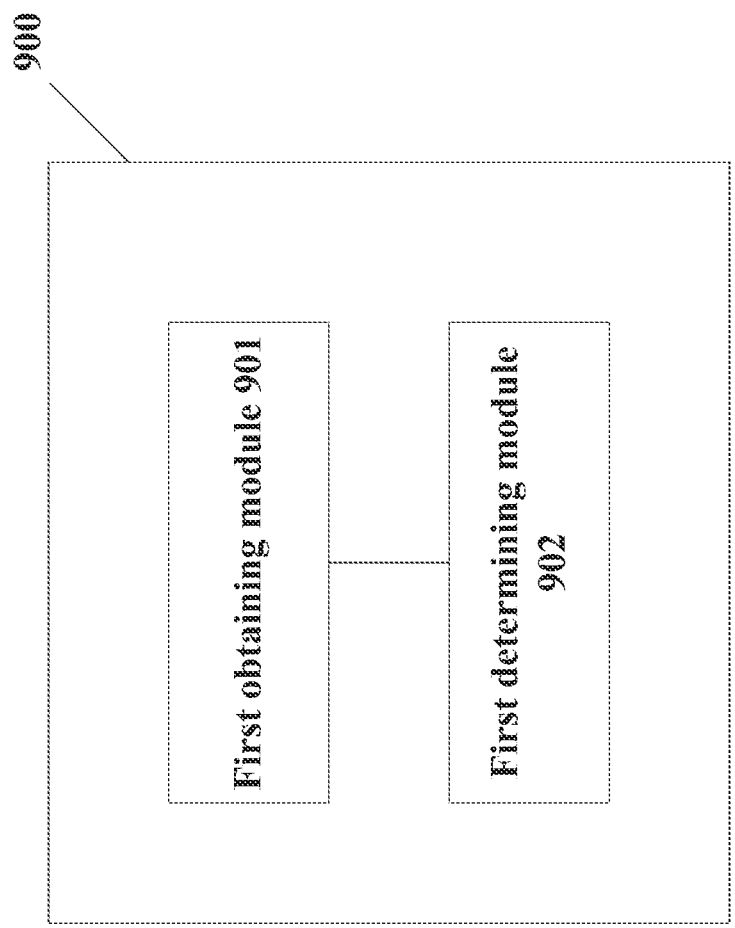
FIG. 9 is a first schematic diagram of a node identification apparatus according to an embodiment of this application.

As shown in FIG. 9, an embodiment of this application provides a node identification apparatus, and the apparatus 900 includes:

a first obtaining module 901, configured to obtain first information, where the first information is related to a signal sent by a base station; and a first determining module 902, configured to determine, according to the first information, one or more nodes associated with the base station, where the node includes at least one of the following: a reconfigurable intelligent surface node, a relay node, or an IAB node.

In this embodiment of this application, the first obtaining module 901 is further configured to: detect a first signal sent by the base station; and determine the first information according to the first signal, where the first information includes characteristic change information of the first signal.

The first determining module 902 is further configured to determine, according to the characteristic change information of the first signal, information about the one or more nodes associated with the base station.

In this embodiment of this application, the apparatus 900 further includes: a second determining module, configured to determine whether a terminal can detect a signal sent by the node, and if the terminal can detect a signal sent by the node, trigger the step of determining the first information according to the first signal.

In this embodiment of this application, the apparatus 900 further includes:

a first sending module, configured to send a detection result of the first signal, where the detection result includes: whether a signal sent by the node can be detected, and/or whether information about the node associated with the base station can be determined.

In this embodiment of this application, the first determining module 902 is further configured to: determine, based on the characteristic change information of the first signal and a first association relationship, an index of the node associated with the base station, where the first association relationship includes an association relationship between a characteristic change rule of the first signal and the index of the node.

In this embodiment of this application, the first association relationship is agreed upon in a protocol or sent by the base station to the terminal.

In this embodiment of this application, the apparatus 900 further includes:

a second obtaining module, configured to: if the node associated with the base station is activated or disabled, obtain information about the activated or disabled node by receiving signaling sent by the base station; or if the association relationship between the characteristic change rule of the first signal and the index of the node changes, obtain, by receiving signaling sent by the base station, an updated association relationship between the characteristic change rule of the first signal and the index of the node.

In this embodiment of this application, the characteristic of the first signal includes one or more of the following: a phase, an amplitude, a polarization manner, a frequency, and an OAM manner.

In this embodiment of this application, that the characteristic change of the first signal is changed or controlled by the node includes: a change in a phase, an amplitude, a polarization manner, a frequency, and/or an OAM manner of the first signal is changed or controlled by adjusting on or off of a diode associated with the node; or a change in a phase, an amplitude, a polarization manner, a frequency, and/or an OAM manner of the first signal is changed or controlled by applying different voltages to the node.

In this embodiment of this application, one or more of the following: a manner in which a characteristic of the first signal changes with a time domain resource, a changing time domain resource granularity, a changing period, changing time unit information, and a start location of the changing period is agreed upon in a protocol or sent by the base station to the terminal.

In this embodiment of this application, the time domain resource granularity is every M OFDM symbols, where M is greater than or equal to 1; or is every N slots, where N is greater than or equal to 1; or is every K SSB periods, where K is greater than or equal to 1.

In this embodiment of this application, one or more of the following: a manner in which the characteristic of the first signal changes with a frequency domain resource and a changing frequency domain resource granularity are agreed upon in a protocol or sent by the base station to the terminal.

In this embodiment of this application, the frequency domain resource granularity is a subcarrier, a subcarrier group, a BWP, a BWP group, an RB, an RB bundle, or an RB group.

In this embodiment of this application, the first signal includes at least one of the following: an SSB, a CSI-RS, a SIB 1, a DMRS, or a TRS.

In this embodiment of this application, the first obtaining module 901 is further configured to: receive a second signal sent by the base station to a first node, where related information of the second signal corresponds to the first node; and determine the first information according to the second signal, where the first information includes the related information of the second signal.

The first determining module 902 is further configured to determine, according to the related information of the second signal, the one or more nodes associated with the base station.

In this embodiment of this application, the related information of the second signal includes at least one of the following:
  a sequence format, a sequence phase, an initial sequence, a scrambling sequence, or an orthogonal cover code of a sequence.

In this embodiment of this application, the first determining module 902 is further configured to determine, according to the related information of the second signal and a second association relationship, an index of the node associated with the base station; where
  the second association relationship includes an association relationship between the related information of the second signal and the index of the node.

In this embodiment of this application, the second association relationship is agreed upon in a protocol or sent by the base station to the terminal.

In this embodiment of this application, the second signal includes one or more of the following: an SSB, a CSI-RS, a DMRS, an MSG 2, an MSG 4, and an MSG B.

In this embodiment of this application, the first obtaining module 901 is further configured to receive first information sent by the base station, where the first information indicates a third association relationship, and the third association relationship includes an association relationship between a third signal and an index of the node.

In this embodiment of this application, the third signal includes one or more of the following: an SSB, a CSI-RS, and a DMRS.

In this embodiment of this application, the apparatus 900 further includes:
  a second sending module, configured to send information about one or more nodes identified by the terminal to a network side.

In this embodiment of this application, the apparatus 900 further includes:
  a third sending module, configured to: if the terminal identifies one or more nodes, send a beam of one or more nodes expected by the terminal to a network side.

The apparatus provided in this embodiment of this application can implement each process implemented in the method embodiment of FIG. 3, and a same technical effect is achieved. To avoid repetition, details are not described herein again.

Figure 10:
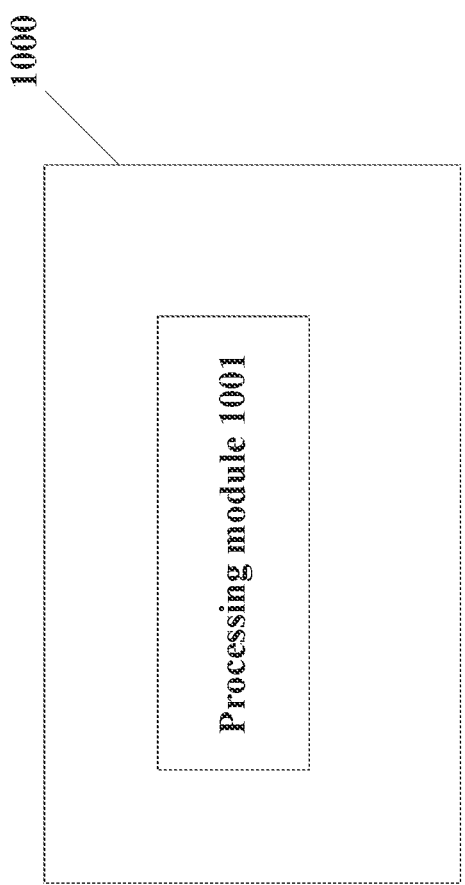
FIG. 10 is a second schematic diagram of a node identification apparatus according to an embodiment of this application.

As shown in FIG. 10, an embodiment of this application provides a node identification apparatus, and the apparatus 1000 includes:
  a processing module 1001, configured to change or control a characteristic of a first signal sent by a base station associated with a node, where characteristic change information of the first signal is associated with information about the node.

In this embodiment of this application, the characteristic of the first signal includes one or more of the following: a phase, an amplitude, a polarization manner, a frequency, and an OAM manner.

In this embodiment of this application, the changing or controlling a characteristic of a first signal sent by a base station associated with a node includes:
  changing or controlling, by adjusting on or off of a diode associated with the node, a phase, an amplitude, a polarization manner, a frequency, and/or an OAM manner of the first signal sent by the base station associated with the node;
  or
  changing or controlling, by applying different voltages to the node, a phase, an amplitude, a polarization manner, a frequency, and/or an OAM manner of the first signal sent by the base station associated with the node.

In this embodiment of this application, one or more of the following: a manner in which a characteristic of the first signal changes with a time domain resource, a changing time domain resource granularity, a changing period, changing time unit information, and a start location of the changing period is agreed upon in a protocol or sent by the base station to the terminal.

In this embodiment of this application, the time domain resource granularity is every M OFDM symbols, where M is greater than or equal to 1; or is every N slots, where N is greater than or equal to 1: or is every K SSB periods, where K is greater than or equal to 1.

In this embodiment of this application, one or more of the following: a manner in which the characteristic of the first signal changes with a frequency domain resource and a changing frequency domain resource granularity are agreed upon in a protocol or sent by the base station to the terminal.

In this embodiment of this application, the frequency domain resource granularity is a subcarrier, a subcarrier group, a BWP, a BWP group, an RB, an RB bundle, or an RB group.

In this embodiment of this application, the first signal includes at least one of the following: an SSB, a CSI-RS, a SIB 1, a DMRS, or a TRS.

In this embodiment of this application, the apparatus 1000 further includes:
  a second obtaining module, configured to receive configuration information sent by the base station associated with the node; where the configuration information includes one or more of the following:
a first association relationship;
a second association relationship;
a third association relationship;
at least one of a time domain resource granularity at which the characteristic of the first signal changes with a time domain resource, a changing period, changing time unit information, or a start location of a changing period; and
at least one of a manner in which the characteristic of the first signal changes with a frequency domain resource and a changing frequency domain resource granularity; where
the first association relationship includes an association relationship between a characteristic change rule of the first signal and an index of the node;
the second association relationship includes an association relationship between the related information of a second signal and the index of the node, and the second signal includes one or more of the following: an SSB, a CSI-RS, a DMRS, an MSG 2, an MSG 4, and an MSG B; and
the third association relationship includes an association relationship between a third signal and the index of the node, and the third signal includes one or more of the following: an SSB, a CSI-RS, and a DMRS.

The apparatus provided in this embodiment of this application can implement each process implemented in the method embodiment of FIG. 4, and a same technical effect is achieved. To avoid repetition, details are not described herein again.

Figure 11:
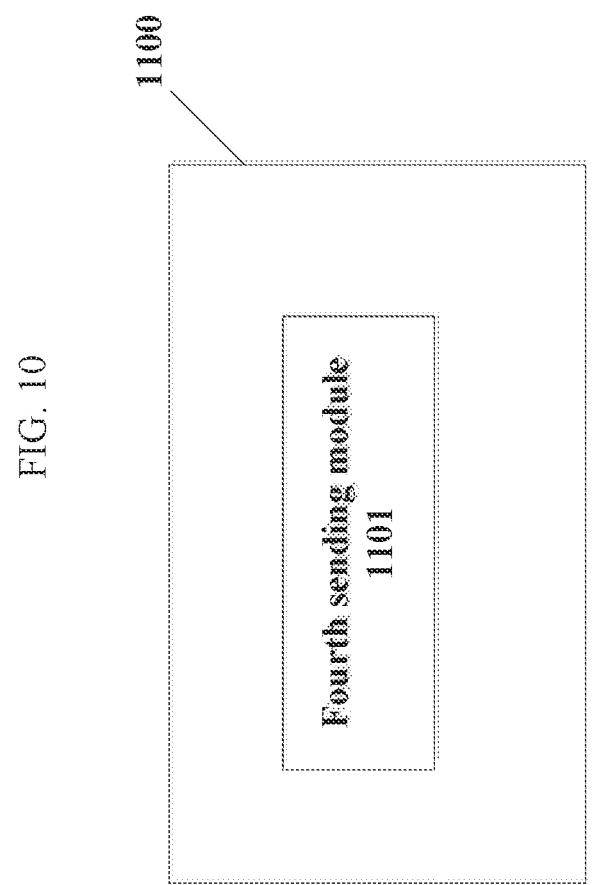
FIG. 11 is a second schematic diagram of a node identification apparatus according to an embodiment of this application.

As shown in FIG. 11, an embodiment of this application provides a node identification apparatus, and the apparatus 1100 includes:
a fourth sending module 1101, configured to send a second signal to a first node associated with a base station, where related information of the second signal corresponds to the first node.

In this embodiment of this application, the related information of the second signal includes at least one of the following: a sequence format, a sequence phase, an initial sequence, a scrambling sequence, or an orthogonal cover code of the sequence.

In this embodiment of this application, the second signal includes one or more of the following: an SSB, a CSI-RS, a DMRS, an MSG 2, an MSG 4, and an MSG B.

In this embodiment of this application, the apparatus 1100 further includes:
a fifth sending module, configured to send configuration information to the first node; where
the configuration information includes one or more of the following:
a first association relationship;
a second association relationship;
a third association relationship;
at least one of a time domain resource granularity at which the characteristic of the first signal changes with a time domain resource, a changing period, changing time unit information, or a start location of a changing period; and
at least one of a manner in which the characteristic of the first signal changes with a frequency domain resource or a changing frequency domain resource granularity; where
the first association relationship includes an association relationship between a characteristic change rule of the first signal and an index of the node;
the second association relationship includes an association relationship between the related information of the second signal and the index of the node; and
the third association relationship includes an association relationship between a third signal and the index of the node, and the third signal includes one or more of the following: an SSB, a CSI-RS, and a DMRS.

The apparatus provided in this embodiment of this application can implement each process implemented in the method embodiment of FIG. 5, and a same technical effect is achieved. To avoid repetition, details are not described herein again.

Figure 12:
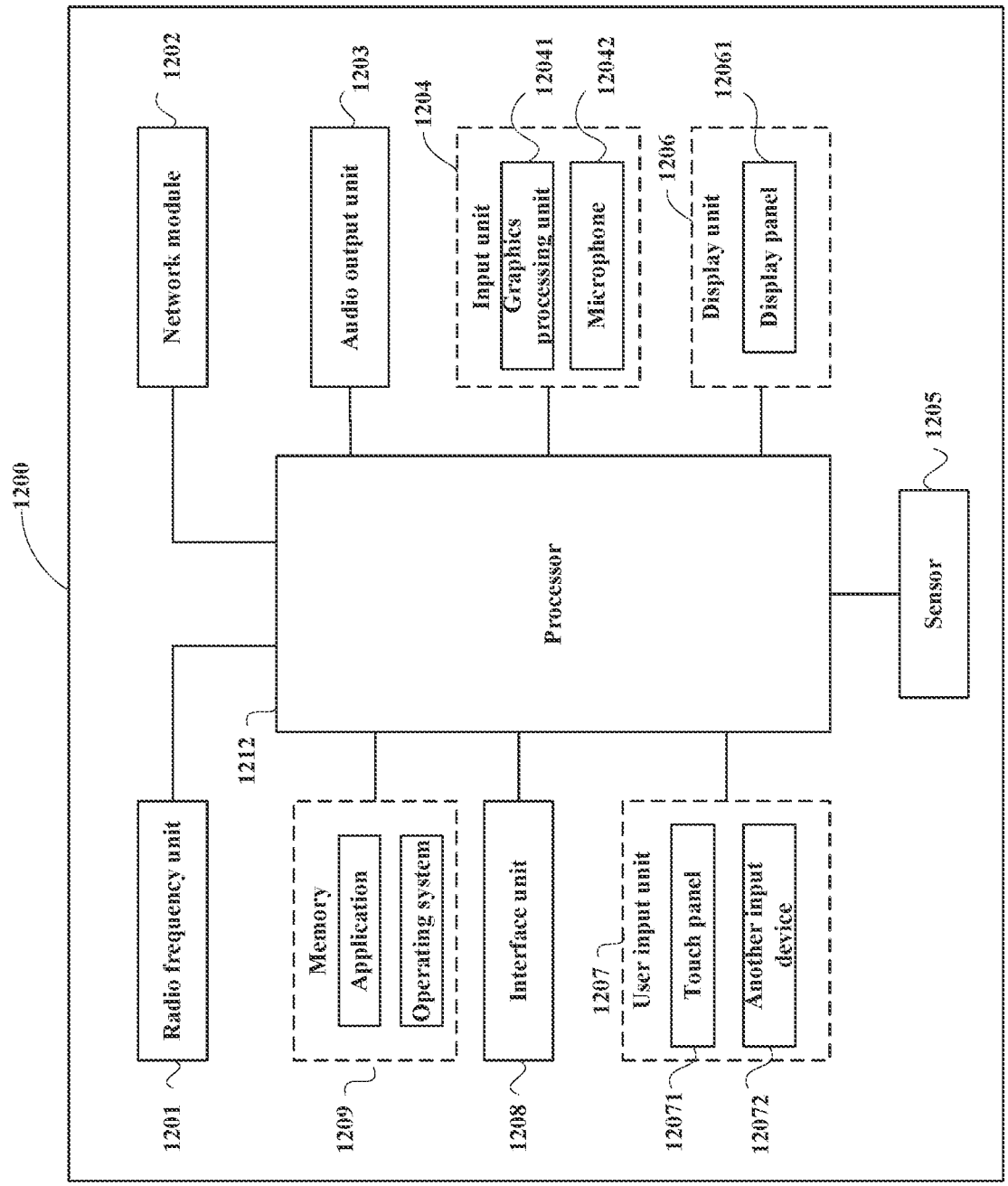
FIG. 12 is a schematic diagram of a terminal according to an embodiment of this application.

FIG. 12 is a schematic diagram of a hardware structure of a terminal according to an embodiment of this application.

The terminal 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

It may be understood by a person skilled in the art that the terminal 1200 may further include a power supply (such as a battery) that supplies power to each component. The power supply may be logically connected to the processor 1210 by using a power management system, to implement functions such as charging, discharging, and power consumption management by using the power management system. A structure of the terminal shown in FIG. 12 does not constitute a limitation on the terminal device, and may include more or fewer parts than those shown in the figure, or combine some parts, or have different part arrangements. Details are not described herein again.

It should be understood that, in this embodiment of this application, the input unit 1204 may include a Graphics Processing Unit (GPU) 12041 and a microphone 12042. The graphics processing unit 12041 processes image data of a static picture or a video obtained by an image capture apparatus (such as a camera) in a video capture mode or an image capture mode. The display unit 1206 may include a display panel 12061, and the display panel 12061 may be configured in a form of a liquid crystal display, an organic light emitting diode, or the like. The user input unit 1207 includes a touch panel 12071 and another input device 12072. The touch panel 12071 is also referred to as a touchscreen. The touch panel 12071 may include two parts: a touch detection apparatus and a touch controller. The another input device 12072 may include but is not limited to one or more of a physical keyboard, a function key (such as a volume control key or an on/off key), a trackball, a mouse, a joystick, and the like. Details are not described herein.

In this embodiment of this application, after receiving downlink data from a network side device, the radio frequency unit 1201 sends the downlink data to the processor 1210 for processing, and sends uplink data to the network side device. Generally, the radio frequency unit 1201 includes but is not limited to an antenna, at least one amplifier, a transceiver, a coupler, a low noise amplifier, a duplexer, and the like.

The memory 1209 may be configured to store a software program or an instruction and various data. The memory 1209 may mainly include a storage program or instruction area and a storage data area, where the storage program or instruction area may store an operating system, an application program or an instruction required by at least one function (such as a sound play function or an image play function), and the like. In addition, the memory 1209 may include a high-speed random access memory, and may further include a non-volatile memory. The non-volatile memory may be a Read-only Memory (ROM), a Programmable ROM (PROM), an Erasable PROM (EPROM), an Electrically EPROM (EEPROM), or a flash memory, for example, at least one magnetic disk storage device, a flash memory device, or another non-volatile solid-state storage device.

The processor 1210 may include one or more processing units. In some embodiments, the processor 1210 may be integrated with an application processor and a modem processor. The application processor mainly processes an operating system, a user interface, an application program or an instruction, and the like, and the modem processor mainly processes wireless communication, for example, a baseband processor. It may be understood that the modem processor may also not be integrated into the processor 1210.

The terminal provided in this embodiment of this application can implement each process implemented in the method embodiment of FIG. 3, and a same technical effect is achieved. To avoid repetition, details are not described herein again.

Figure 13:
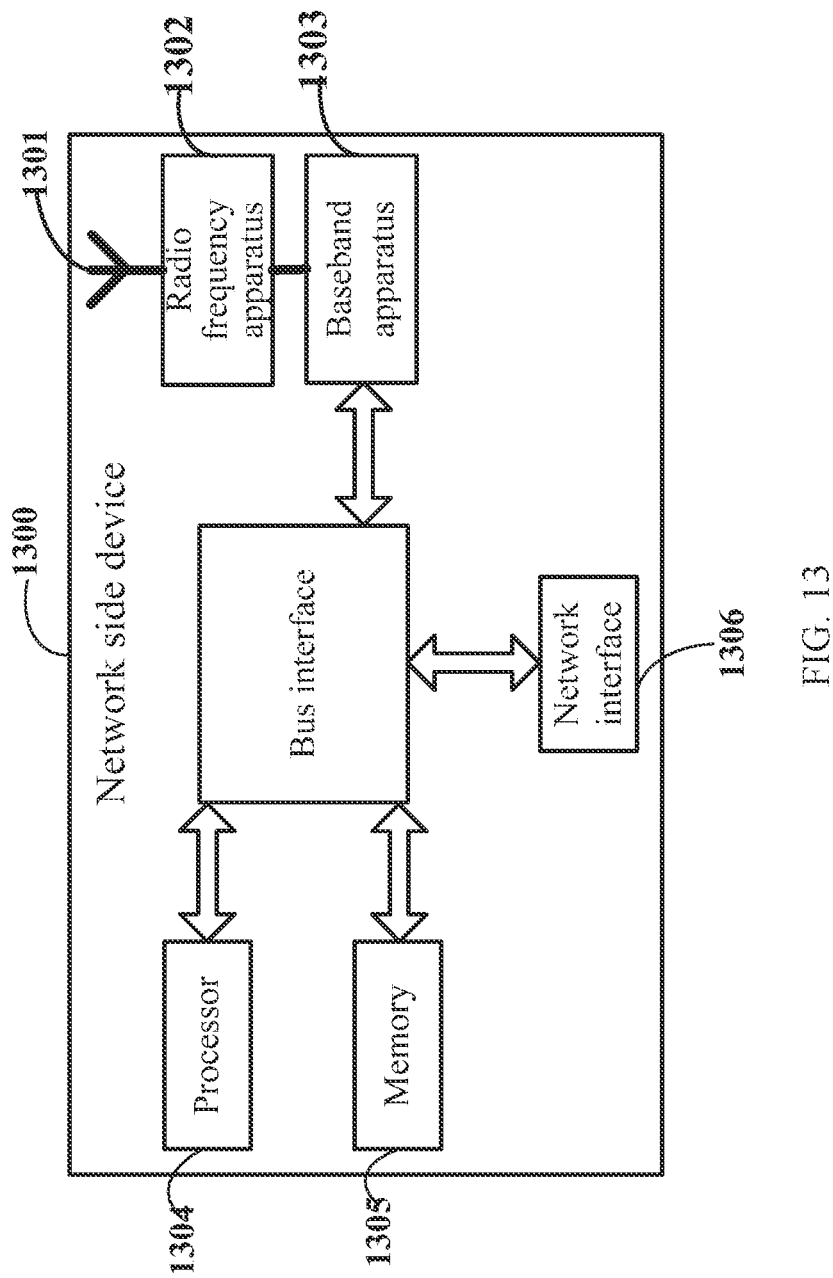
FIG. 13 is a schematic diagram of a network side device according to an embodiment of this application.

An embodiment of this application further provides a network side device. As shown in FIG. 13, the network side device 1300 includes an antenna 1301, a radio frequency apparatus 1302, and a baseband apparatus 1303. The antenna 1301 is connected to the radio frequency apparatus 1302. In an uplink direction, the radio frequency apparatus 1302 receives information by using the antenna 1301, and sends the received information to the baseband apparatus 1303 for processing. In a downlink direction, the baseband apparatus 1303 processes to-be-sent information, and sends the to-be-sent information to the radio frequency apparatus 1302. After processing the received information, the radio frequency apparatus 1302 sends the information by using the antenna 1301.

The foregoing band processing apparatus may be located in the baseband apparatus 1303. In the foregoing embodiment, a method performed by the network side device may be implemented in the baseband apparatus 1303. The baseband apparatus 1303 includes a processor 1304 and a memory 1305.

For example, the baseband apparatus 1303 may include at least one baseband board. Multiple chips are disposed on the baseband board. As shown in FIG. 13, one chip is, for example, the processor 1304, and is connected to the memory 1305, to invoke a program in the memory 1305 to perform an operation of the network side device shown in the foregoing method embodiment.

The baseband apparatus 1303 may further include a network interface 1306, configured to exchange information with the radio frequency apparatus 1302, where the interface is, for example, a common public radio interface (CPRI).

The network side device in this embodiment of this application further may include an instruction or a program that is stored in the memory 1305 and that can run on the processor 1304. The processor 1304 invokes the instruction or the program in the memory 1305 to perform the method performed by the modules shown in FIG. 10 and FIG. 11, and a same technical effect is achieved. To avoid repetition, details are not described herein.

An embodiment of this application further provides a program product. The program product is stored in a non-volatile storage medium, and the program product is executed by at least one processor to implement steps of the methods described in FIG. 3 to FIG. 5.

An embodiment of this application further provides a readable storage medium. A program or an instruction is stored in the readable storage medium. When the program or the instruction is executed by a processor, the processes of the method embodiment in FIG. 3 to FIG. 5 can be implemented, and a same technical effect can be achieved. To avoid repetition, details are not described herein.

The processor is a processor in the terminal in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a chip. The chip includes a processor and a communication interface, the communication interface is coupled to the processor, and the processor is configured to run a program or an instruction of a network side device to implement the processes of the method embodiments in FIG. 3 to FIG. 5, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or may be implemented by using hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. A method for node identification, performed by a terminal, comprising:
   obtaining first information, wherein the first information comprises characteristic change information of a signal sent by a base station, wherein the characteristic change information comprises changing of one or more of the following: a phase, an amplitude, a polarization manner, a frequency, or an orbital angular momentum (OAM) manner; and
   determining, according to the first information, one or more nodes associated with the base station,
   wherein the one or more nodes comprise at least one of the following:
      a reconfigurable intelligent surface node;
      a relay node; or
      an integrated access and backhaul (IAB) node.

2. The method according to claim 1, wherein obtaining the first information comprises:
   detecting a first signal sent by the base station; and
   determining the first information according to the first signal, wherein the first information comprises characteristic change information of the first signal; and
   wherein determining, according to the first information, the one or more nodes associated with the base station comprises:
   determining, according to the characteristic change information of the first signal, information about the one or more nodes associated with the base station.

3. The method according to claim 2, wherein before detecting the first signal sent by the base station, the method further comprises:
   determining whether the terminal detects a signal sent by the node; and
   when the terminal detects the signal sent by the node, performing determining the first information according to the first signal.

4. The method according to claim 2, wherein determining, according to the characteristic change information of the first signal, the information about the one or more nodes associated with the base station comprises:
   determining, according to the characteristic change information of the first signal and a first association relationship, an index of the node associated with the base station, wherein the first association relationship comprises an association relationship between a characteristic change rule of the first signal and the index of the node.

5. The method according to claim 2, wherein one or more of the following is agreed upon in a protocol or sent by the base station to the terminal: a manner in which a characteristic of the first signal changes with a time domain resource, a changing time domain resource granularity, a changing period, changing time unit information, or a start location of the changing period.

6. The method according to claim 2, wherein the time domain resource granularity is every M orthogonal frequency division multiplexing symbols, wherein M is greater than or equal to 1; or is every N slots, wherein N is greater than or equal to 1; or is every K synchronization signal block (SSB) periods, wherein K is greater than or equal to 1.

7. The method according to claim 2, wherein one or more of the following is agreed upon in a protocol or sent by the base station to the terminal: a manner in which a characteristic of the first signal changes with a time domain resource or a changing frequency domain resource granularity.

8. The method according to claim 7, wherein the frequency domain resource granularity is a subcarrier, a subcarrier group, a bandwidth part (BWP), a BWP group, a radio bearer (RB), an RB bundle, or an RB group.

9. The method according to claim 2, wherein the first signal comprises at least one of the following: an SSB, a channel state information reference signal (CSI-RS), a system information block 1, a demodulation reference signal (DMRS), or a tracking reference signal (TRS).

10. The method according to claim 1, wherein obtaining the first information comprises:
    receiving a second signal sent by the base station to a first node, wherein related information of the second signal corresponds to the first node; and
    determining the first information according to the second signal, wherein the first information comprises the related information of the second signal; and
    wherein determining, according to the first information, the one or more nodes associated with the base station comprises:
    determining, according to the related information of the second signal, the one or more nodes associated with the base station.

11. The method according to claim 10, wherein the related information of the second signal comprises at least one of the following:
    a sequence format, a sequence phase, an initial sequence, a scrambling sequence, or an orthogonal cover code of a sequence.

12. The method according to claim 10, wherein determining, according to the related information of the second signal, the one or more nodes associated with the base station comprises:
    determining, according to the related information of the second signal and a second association relationship, an index of the node associated with the base station,
    wherein the second association relationship comprises an association relationship between the related information of the second signal and the index of the node, the second association relationship is agreed upon in a protocol or sent by the base station to the terminal.

13. A method for node identification, performed by a node, comprising:
    changing or controlling a characteristic of a first signal sent by a base station associated with the node,
    wherein characteristic change information of the first signal is associated with information about the node, and the characteristic change information comprises changing of one or more of the following: a phase, an amplitude, a polarization manner, a frequency or an orbital angular momentum (OAM) manner.

14. The method according to claim 13, wherein one or more of the following is agreed upon in a protocol or sent by the base station to a terminal: a manner in which a characteristic of the first signal changes with a time domain resource, a changing time domain resource granularity, a changing period, changing time unit information, or a start location of the changing period,
    wherein the time domain resource granularity is every M orthogonal frequency division multiplexing symbols, wherein M is greater than or equal to 1; or is every N slots, wherein N is greater than or equal to 1; or is every K SSB periods, wherein K is greater than or equal to 1.

15. The method according to claim 13, wherein one or more of the following is agreed upon in a protocol or sent by the base station to a terminal, a manner in which a characteristic of the first signal changes with a time domain resource or a changing frequency domain resource granularity wherein the frequency domain resource granularity is a subcarrier, a subcarrier group, a BWP, a BWP group, an RB, an RB bundle, or an RB group.

16. A method for node identification, performed by a base station, comprising:

sending a second signal to a first node associated with the base station, wherein related information of the second signal corresponds to the first node and comprises characteristic change information of the signal sent by a base station, wherein the characteristic change information comprises changing of one or more of the following: a phase, an amplitude, a polarization manner, a frequency, or an orbital angular momentum (OAM) manner.

17. The method according to claim 16, wherein the related information of the second signal comprises at least one of the following:

a sequence format, a sequence phase, an initial sequence, a scrambling sequence, or an orthogonal cover code of a sequence, wherein the second signal comprises one or more of the following: an SSB, a CSI-RS, a DMRS, a message 2, a message 4, or a message B.

18. The method according to claim 16, further comprising:

sending configuration information to the first node,
wherein the configuration information comprises one or more of the following:
  a first association relationship;
  a second association relationship;
  a third association relationship;
  at least one of a time domain resource granularity at which a characteristic of a first signal changes with a time domain resource, a changing period, changing time unit information, and a start location of the changing period, wherein the first signal comprises at least one of the following: an SSB, a CSI-RS, a system information block 1, a DMRS, or a TRS; or
  at least one of a manner in which the characteristic of the first signal changes with a frequency domain resource or a changing frequency domain resource granularity, wherein
    the first association relationship comprises an association relationship between a characteristic change rule of the first signal and an index of the node;
    the second association relationship comprises an association relationship between the related information of the second signal and the index of the node; and
    the third association relationship comprises an association relationship between a third signal and the index of the node, and the third signal comprises one or more of the following: an SSB, a CSI-RS, or a DMRS.

* * * * *